(12) United States Patent
Zhu et al.

(10) Patent No.: US 11,981,784 B2
(45) Date of Patent: May 14, 2024

(54) PREPARATION METHOD AND PRODUCT OF THERMOPLASTIC CARBON FIBER FABRIC PREPREG

(71) Applicant: SHANDONG KUANYUAN NEW MATERIAL TECHNOLOGY CO., LTD., Dezhou (CN)

(72) Inventors: Bo Zhu, Dezhou (CN); Weiwei Cao, Dezhou (CN); Yongwei Wang, Dezhou (CN); Anping Zhu, Dezhou (CN)

(73) Assignee: SHANDONG KUANYUAN NEW MATERIAL TECHNOLOGY CO., LTD., Dezhou (CN)

( * ) Notice: Subject to any disclaimer, the term of this patent is extended or adjusted under 35 U.S.C. 154(b) by 126 days.

(21) Appl. No.: 17/675,007

(22) Filed: Feb. 18, 2022

(65) Prior Publication Data
US 2023/0265254 A1 Aug. 24, 2023

(51) Int. Cl.
C08J 5/24 (2006.01)
B05D 1/02 (2006.01)
B05D 3/00 (2006.01)
B05D 3/12 (2006.01)

(52) U.S. Cl.
CPC ............ *C08J 5/243* (2021.05); *B05D 1/02* (2013.01); *B05D 3/007* (2013.01); *B05D 3/12* (2013.01); *B05D 2518/00* (2013.01); *C08J 2379/08* (2013.01)

(58) Field of Classification Search
CPC ......... C08J 5/243; C08J 2379/00; B05D 1/02; B05D 3/007; B05D 3/12; B05D 2518/00
USPC ....................................................... 428/365
See application file for complete search history.

Primary Examiner — Camie S Thompson
(74) Attorney, Agent, or Firm — JCIPRNET

(57) ABSTRACT

A preparation method and a product of thermoplastic carbon fiber fabric prepreg are provided. The preparation method includes: covering a thermoplastic polyimide non-woven fabric on a carbon fiber fabric to obtain a laminated structure, pressing the laminated structure, then spraying polyphenylene sulfide nanoparticles onto the thermoplastic polyimide non-woven fabric, and performing a two-stage hot melting preparation process which includes: in a first stage, heating up to make the polyphenylene sulfide nanoparticles be melted and infiltrate and keeping a hot melting time of 5-10 min; and in a second stage, heating up to make the thermoplastic polyimide non-woven fabric be melted and infiltrate into the carbon fiber fabric and cooling down after a duration of heat preservation to prepare the thermoplastic carbon fiber fabric prepreg. The thermoplastic carbon fiber fabric prepreg prepared by the two-stage hot melting has high strength and may be stored for a long period.

10 Claims, No Drawings

PREPARATION METHOD AND PRODUCT OF THERMOPLASTIC CARBON FIBER FABRIC PREPREG

TECHNICAL FIELD

The application relates to the technical field of carbon fiber prepregs, and in particular to preparation methods and products of thermoplastic carbon fiber fabric prepreg.

BACKGROUND

As thermoset resin-based composites are widely used, application issues caused by their physical properties have emerged constantly. The three-dimensional network resin structure formed by the thermoset resin after being cross-linked with curing agents, has good mechanical properties, but the non-melting and insoluble structure brings about the problem of impossible secondary plasticisation, and greatly affects the development of thermoset resin-based composites. In order to improve the performance of resin-based composites and to broaden their applications, thermoplastic carbon fiber composites that can be repeatedly plasticised have been studied by developers, and fabric prepreg, an important intermediate in the composite moulding process, has become the focus of research in the preparation of thermoplastic composites.

Thermoplastic polyimide has excellent properties such as high temperature resistance, low temperature resistance, irradiation resistance, insoluble in organic solvents and high insulation, etc. A prepreg prepared with laminating carbon fiber fabrics and thermoplastic polyimide could offer various advantages such as high strength and unlimited storage life.

However, the physical characteristics of thermoplastic polyimide, such as high viscosity, low fluidity and poor compatibility to carbon fibers, make it difficult for thermoplastic polyimide to infiltrate carbon fibers, which limits the preparation of composite prepreg from thermoplastic polyimide and carbon fibers, and no technical schemes are available in the field to make prepreg from the two at present.

SUMMARY

A thermoplastic polyimide non-woven fabric is put and pressed on top of a carbon fiber fabric, polyphenylene sulfide nanoparticles are sprayed onto the thermoplastic polyimide non-woven fabric, and then the temperature is adjusted higher until the molten polyphenylene sulfide penetrates into the carbon fiber fabric. After some time the temperature rises up until the thermoplastic polyimide non-woven fabric is molten. The first penetrated polyphenylene sulfide melt acts as a guiding liquid to make the thermoplastic polyimide melt penetrate into the carbon fiber fabric; under the guidance of the polyphenylene sulfide melt, the disadvantage of poor compatibility between the thermoplastic polyimide and the carbon fiber is eliminated, and a thermoplastic carbon fiber fabric prepreg with excellent performance is prepared consequently.

In order to achieve the above objectives, the present application provides the following technical scheme:
one of the technical schemes of the present application: a method for preparing a carbon fiber fabric prepreg, including the steps of:
covering a carbon fiber fabric with a thermoplastic polyimide non-woven fabric, pressing the laminated structure together, then spraying polyphenylene sulfide nanoparticles onto the thermoplastic polyimide non-woven fabric, and performing a two-stage hot melting preparation process. The two-stage hot melting preparation process includes: firstly, in a first stage, heating up to make the polyphenylene sulfide nanoparticles be melted and infiltrated into the carbon fiber fabric uniformly through pores on the thermoplastic polyimide non-woven fabric, and keeping a hot melting time of 5-10 min; and afterwards, in a second stage, heating up to make the thermoplastic polyimide non-woven fabric be melted and infiltrated into the carbon fiber fabric and cooling down after a duration of heat preservation (also referred to as temperature maintain) to thereby prepare a thermoplastic carbon fiber fabric prepreg.

In an embodiment, the carbon fiber fabric has a thickness in a range of 0.05-0.2 mm and is made of a continuous carbon fiber tow of 3K (thousand), 6K or 12K.

In an embodiment, the carbon fibers in the carbon fiber fabric include any one of T300, T700, T800 and T1000 carbon fibers.

In an embodiment, the thermoplastic polyimide non-woven fabric has a thickness in a range of 0.05-0.1 mm and a gram weight in a range of 20-50 g/m$^2$.

The raw materials of thermoplastic polyimide non-woven fabric used in this application may include Ultem of GE or Kapton of DuPont.

In an embodiment, the particle sizes of the polyphenylene sulfide nanoparticles are in a range of 20-50 nm.

In an embodiment, the amount of polyphenylene sulfide nanoparticles sprayed on the thermoplastic polyimide non-woven fabric is in a range of 3-5 g/m$^2$.

In an embodiment, the heating up in the first stage refers to rising the temperature to 290-300° C.;
under these temperatures, the polyphenylene sulfide nanoparticles are completely melted, and high heat loss during the hot melting infiltration is avoided.

In an embodiment, the heating up in the second stage is to rise the temperature to 400-420° C.;
under this temperature range, the thermoplastic polyimide non-woven is melted, and the polyphenylene sulfide is not decomposed.

In an embodiment, the duration of heat preservation is in a range of 60-90 min.

In an embodiment, the cooling down refers to cooling the thermoplastic carbon fiber fabric prepreg to below 50° C. (degree Celsius).

A further technical scheme of the application is to provide a thermoplastic carbon fiber fabric prepreg prepared according to the preparation method of the thermoplastic carbon fiber fabric prepreg.

The application may have the following beneficial technical effects:
the poor compatibility of thermoplastic polyimide with carbon fiber fabric makes it difficult for the thermoplastic polyimide melt to penetrate deeply into the carbon fiber fabric; according to the application, the non-woven fabric made of thermoplastic polyimide is first pressed with the carbon fiber fabric together, then nano-particles made of polyphenylene sulfide with good compatibility with carbon fiber are sprayed onto the thermoplastic polyimide non-woven fabric, and then the polyphenylene sulfide nanoparticles are melted by heating; the melted polyphenylene sulfide penetrates into the carbon fiber fabric uniformly through the pores on the thermoplastic polyimide non-woven fabric, and then the temperature is continuously adjusted higher to melt the thermoplastic polyimide non-woven fabric; the obtained thermoplastic polyimide melt is uniformly infiltrated into the carbon fiber fabric through the polyphenylene sulfide melt which has been uniformly infiltrated into the carbon fiber fabric as the guiding liquid; by doing so, the problem of poor compatibility between the thermoplastic polyimide and the carbon fiber is then eliminated.

Based on the technical scheme of the present application, the thermoplastic material prepared is uniformly distributed in the thermoplastic carbon fiber fabric prepreg, resulting in significantly improved mechanical properties of thermoplastic carbon fiber fabric prepreg like strength; moreover, the main raw materials used are carbon fiber and thermoplastic polyimide, so the product prepared is exceptionally stable and therefore has a long storage life.

DETAILED DESCRIPTION OF EMBODIMENTS

Various exemplary embodiments of the application are now described in detail and this detailed description should not be considered as limiting the application, but should be understood as a more detailed description of certain aspects, features and embodiments of the application. It should be understood that the terms described in the present application are intended to describe particular embodiments only and are not intended to limit the present application.

Further, it is to be understood that for the range of values in the present application, each intermediate value between the upper and lower limits of the range is also specifically disclosed. Each smaller range between any stated value or intermediate value within a stated range, and any other stated value or intermediate value within a stated range is also included in the present application. The upper and lower limits of these smaller ranges may be independently included or excluded from the scope.

Unless otherwise stated, all technical and scientific terms used herein have the same meaning as is commonly understood by those of ordinary skill in the field described in the present application. Although the present application describes only preferred methods and materials, any methods and materials similar or equivalent to those described herein may also be used in the implementation or testing of the present application.

As used herein, the terms "comprising", "including", "having", "containing" and the like are open-ended, i.e. they mean including but not limited to.

The raw material of thermoplastic polyimide non-woven fabric used in embodiments 1-4 and Comparative embodiments 1-2 of the present application may be Ultem of GE.

The raw material of thermoplastic polyimide non-woven fabric used in Embodiments 5 to 6 of the present application is Kapton of DuPont.

Embodiment 1

Steps for preparing thermoplastic carbon fiber fabric prepreg:
(1) using T300 carbon fiber continuous tow of 3K to prepare unidirectional carbon fiber fabric with a thickness of 0.1 mm with tow spreading machine;
(2) pressing the thermoplastic polyimide non-woven fabric with a thickness of 0.05 mm and a gram weight of 20 g/m$^2$ with the unidirectional carbon fiber fabric prepared in step (1) with a roller device;
(3) placing the thermoplastic polyimide side of the fabric from step (2) upwards, spraying polyphenylene sulfide nanoparticles of 20 nm particle size in an amount of 3 g/m$^2$; placing it in a heating device, increasing the temperature at a rate of 50° C./min to 300° C. and keeping 300° C. for 10 min; then increasing the temperature at a rate of 50° C./min to 400° C. and keeping 400° C. for 90 min; and cooling down to room temperature to prepare the thermoplastic carbon fiber fabric prepreg.

Embodiment 2

Steps for preparing thermoplastic carbon fiber fabric prepreg:
(1) using T700 carbon fiber continuous tow of 6K to prepare unidirectional carbon fiber fabric with a thickness of 0.05 mm with tow spreading machine;
(2) pressing the thermoplastic polyimide non-woven fabric with a thickness of 0.05 mm and a gram weight of 25 g/m$^2$ with the unidirectional carbon fiber fabric prepared in step (1) with a roller device;
(3) placing the thermoplastic polyimide side of the fabric from step (2) upwards, spraying polyphenylene sulfide nanoparticles of particle size 30 nm in an amount of 4 g/m$^2$; placing it in a heating device, increasing the temperature at a rate of 50° C./min to 300° C. and keeping 300° C. for 8 min; then increasing the temperature at a rate of 50° C./min to 400° C. and keeping 400° C. for 75 min; and cooling down to room temperature to prepare the thermoplastic carbon fiber fabric prepreg.

Embodiment 3

Steps for preparing thermoplastic carbon fiber fabric prepreg:
(1) using T800 carbon fiber continuous tow of 12K to prepare unidirectional carbon fiber fabric with a thickness of 0.1 mm with tow spreading machine;
(2) pressing the thermoplastic polyimide non-woven fabric with a thickness of 0.1 mm and a gram weight of 35 g/m$^2$ with the unidirectional carbon fiber fabric prepared in step (1) with a roller device;
(3) placing the thermoplastic polyimide side of the fabric from step (2) upwards, spraying polyphenylene sulfide nanoparticles of particle size 40 nm in an amount of 4 g/m$^2$; placing it in a heating device, increasing the temperature at a rate of 50° C./min to 290° C. and keeping 290° C. for 10 min; then increasing the temperature at a rate of 50° C./min to 420° C. and keeping 420° C. for 60 min; and cooling down to room temperature to prepare the thermoplastic carbon fiber fabric prepreg.

Embodiment 4

Steps for preparing thermoplastic carbon fiber fabric prepreg:
(1) using T1000 carbon fiber continuous tow of 3K to prepare unidirectional carbon fiber fabric with a thickness of 0.2 mm with tow spreading machine;
(2) pressing the thermoplastic polyimide non-woven fabric with a thickness of 0.1 mm and a gram weight of 50 g/m$^2$ with the unidirectional carbon fiber fabric prepared in step (1) with a roller device;
(3) placing the thermoplastic polyimide side of the fabric from step (2) upwards, spraying polyphenylene sulfide nanoparticles with particle size 50 nm in an amount of 5 g/m$^2$; placing it in a heating device, increasing the temperature at a rate of 50° C./min to 290° C. and keeping 290° C. for 5 min; then increasing the temperature at a rate of 50° C./min to 400° C. and keeping 400° C. for 90 min; and cooling down to room temperature to prepare the thermoplastic carbon fiber fabric prepreg.

Embodiment 5

Steps for preparing thermoplastic carbon fiber fabric prepreg:
(1) using T300 carbon fiber continuous tow of 6K to prepare unidirectional carbon fiber fabric with a thickness of 0.1 mm with tow spreading machine;
(2) pressing the thermoplastic polyimide non-woven fabric with a thickness of 0.1 mm and a gram weight of 50 g/m$^2$ with the unidirectional carbon fiber fabric prepared in step (1) with a roller device;
(3) placing the thermoplastic polyimide side of the fabric from step (2) upwards, spraying with 50 nm polyphenylene sulfide nanoparticles in an amount of 5 g/m$^2$; placing it in a heating device, increasing the temperature at a rate of 50° C./min to 300° C. and keeping 300° C. for 5 min; then increasing the temperature at a rate of 50° C./min to 400° C. and keeping 400° C. for 90 min; and cooling down to room temperature to prepare the thermoplastic carbon fiber fabric prepreg.

Embodiment 6

Steps for preparing thermoplastic carbon fiber fabric prepreg:
(1) using T300 carbon fiber cloth of 12K to prepare unidirectional carbon fiber fabric with a thickness of 0.05 mm with tow spreading machine;
(2) pressing the thermoplastic polyimide non-woven fabric with a thickness of 0.1 mm and a gram weight of 50 g/m$^2$ with the unidirectional carbon fiber fabric prepared in step (1) with a roller device;
(3) placing the thermoplastic polyimide side of the fabric from step (2) upwards, spraying polyphenylene sulfide nanoparticles of particle size 50 nm in an amount of 5 g/m$^2$; placing it in a heating device, increasing the temperature at a rate of 50° C./min to 300° C. and keeping 300° C. for 5 min; then increasing the temperature at a rate of 50° C./min to 400° C. and keeping 400° C. for 90 min; and cooling down to room temperature to prepare the thermoplastic carbon fiber fabric prepreg.

Comparative Embodiment 1

Steps for preparing thermoplastic carbon fiber fabric prepreg (compared with Embodiment 1, the difference is that polyphenylene sulfide nanoparticles are not added):
(1) using T300 carbon fiber continuous tow of 3 K to prepare unidirectional carbon fiber fabric with a thickness of 0.1 mm with tow spreading machine;
(2) pressing the thermoplastic polyimide non-woven fabric with a thickness of 0.05 mm and a gram weight of 20 g/m$^2$ with the unidirectional carbon fiber fabric prepared in step (1) with a roller device;
(3) placing the thermoplastic polyimide side of the fabric pressed in step (2) upward in a heating device, and increasing the temperature to 300° C. at a rate of 50° C./min for 10 min; then, raising the temperature to 400° C. at a rate of 50° C./min, and keeping the temperature for 90 min; and cooling the material to room temperature to obtain thermoplastic carbon fiber fabric prepreg.

Comparative Embodiment 2

Steps for preparing thermoplastic carbon fiber fabric prepreg (compared with Embodiment 1, the difference is that the temperature rising is adjusted):
(1) using T300 carbon fiber continuous tow of 3 K to prepare unidirectional carbon fiber fabric with a thickness of 0.1 mm with tow spreading machine;
(2) pressing the thermoplastic polyimide non-woven fabric with a thickness of 0.05 mm and a gram weight of 20 g/m$^2$ with the unidirectional carbon fiber fabric prepared in step (1) with a roller device;
(3) placing the thermoplastic polyimide side of the fabric pressed in step (2) upwards, and spraying polyphenylene sulfide nanoparticles with a particle size of 20 nm in an amount of 3 g/m$^2$; placing in a heating device, heating to 400° C. at a rate of 50° C./min, and keeping 400° C. for 50° C./min; and cooling down room temperature to obtain thermoplastic carbon fiber fabric prepreg.

Testing Embodiment 1

According to JC-H02 *Carbon fiber Cloth Testing Specifications*, the tensile strength, tensile elastic modulus and elongation at break of thermoplastic carbon fiber fabric prepregs prepared in Embodiment 1 and Comparative embodiments 1-2 are determined, and the results are shown in Table 1.

TABLE 1

|  | Tensile strength (GPa) | Tensile elastic modulus (GPa) | Elongation at break (%) |
| --- | --- | --- | --- |
| Embodiment 1 | 2 | 130 | 1.6 |
| Comparative embodiment 1 | 1.2 | 78 | 1.4 |
| Comparative embodiment 2 | 1.5 | 95 | 1.5 |

As can be seen from Table 1, the mechanical properties of the thermoplastic carbon fiber fabric prepreg produced without polyphenylene sulfide nanoparticles (Comparative embodiment 1) are significantly degraded; if the polyphenylene sulfide melt is not infiltrated into the carbon fiber fabric beforehand (Comparative embodiment 2), mechanical properties of the thermoplastic carbon fiber fabric prepreg prepared are also impaired The above-mentioned embodiments only describe preferred modes of the present application, and do not limit the scope of the present application. Without departing from the design spirit of the present application, all kinds of modifications and improvements made by ordinary technicians in the field to the technical scheme of the present application shall fall within the protection scope determined by the appended claims of the present application.

What is claimed is:
1. A method for preparing a thermoplastic carbon fiber fabric prepreg, comprising the following steps:
covering a carbon fiber fabric with a thermoplastic polyimide non-woven fabric to obtain a laminated structure, pressing the laminated structure together, then spraying polyphenylene sulfide nanoparticles onto the thermo- plastic polyimide non-woven fabric, and carrying out a two-stage hot melting preparation process;

wherein the two-stage hot melting preparation process comprises: firstly, in a first stage, heating up to make the polyphenylene sulfide nanoparticles be melted and infiltrated into the carbon fiber fabric uniformly through pores on the thermoplastic polyimide non-woven fabric, and keeping a hot melting time of 5-10 minutes (min); and afterwards, in a second stage, heating up to make the thermoplastic polyimide non-woven fabric be melted and infiltrated into the carbon fiber fabric and cooling down after a duration of heat preservation to thereby prepare the thermoplastic carbon fiber fabric prepreg.

2. The method for preparing the thermoplastic carbon fiber fabric prepreg according to claim 1, wherein the carbon fiber fabric has a thickness of 0.05-0.2 mm and is made of a continuous carbon fiber tow of 3K, 6K or 12K.

3. The method for preparing the thermoplastic carbon fiber fabric prepreg according to claim 1, wherein carbon fibers in the carbon fiber fabric comprise any one of T300, T700, T800 and T1000 carbon fibers.

4. The method for preparing the thermoplastic carbon fiber fabric prepreg according to claim 1, wherein the thermoplastic polyimide non-woven fabric has a thickness of 0.05-0.1 mm and a gram weight of 20-50 grams per square meter (g/m$^2$).

5. The method for preparing the thermoplastic carbon fiber fabric prepreg according to claim 1, wherein particle sizes of polyphenylene sulfide nanoparticles are 20-50 nm.

6. The method for preparing the thermoplastic carbon fiber fabric prepreg according to claim 1, wherein an amount of the polyphenylene sulfide nanoparticles sprayed on thermoplastic polyimide non-woven fabric is 3-5 g/m$^2$.

7. The method for preparing the thermoplastic carbon fiber fabric prepreg according to claim 1, wherein the heating up in the first stage is to rise the temperature up to 290-300° C.

8. The method for preparing the thermoplastic carbon fiber fabric prepreg according to claim 1, wherein the heating up in the second stage is to rise the temperature to 400-420° C.

9. The method for preparing the thermoplastic carbon fiber fabric prepreg according to claim 1, wherein the duration of heat preservation is 60-90 min.

10. The method for preparing the thermoplastic carbon fiber fabric prepreg according to claim 1, wherein the cooling down is to cool the thermoplastic carbon fiber fabric prepreg to below 50° C.

* * * * *